(No Model.)
H. D. CAHILL.
BICYCLE CARRIER.
No. 573,502. Patented Dec. 22, 1896.
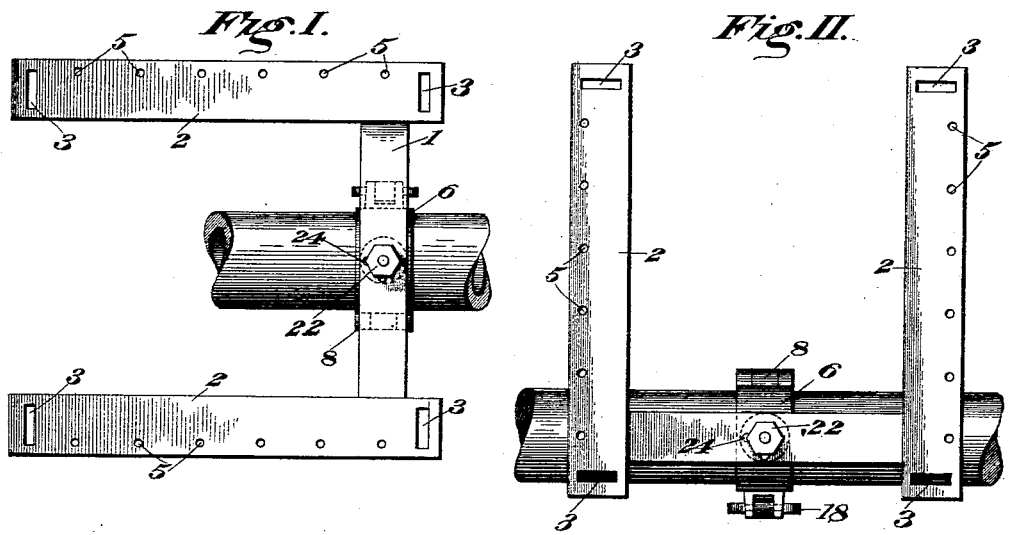
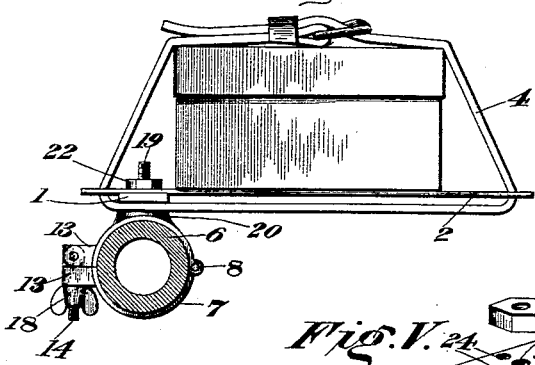
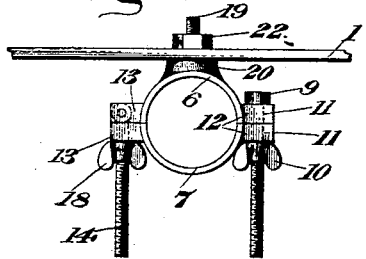
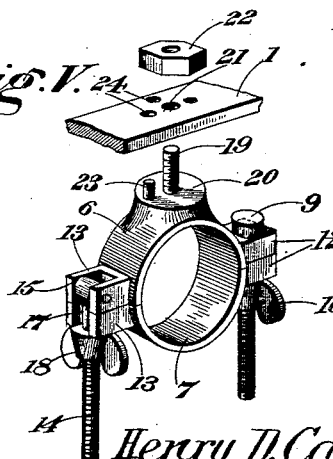
Witnesses
M. E. Fowler
Samuel N. Acker
Henry D. Cahill
Inventor
By Joseph L. Atkins
Attorney

UNITED STATES PATENT OFFICE.

HENRY D. CAHILL, OF BOSTON, MASSACHUSETTS, ASSIGNOR OF ONE-THIRD TO JAMES E. McCAFFERTY, OF SAME PLACE.

BICYCLE-CARRIER.

SPECIFICATION forming part of Letters Patent No. 573,502, dated December 22, 1896.

Application filed December 29, 1894. Serial No. 533,365. (No model.)

*To all whom it may concern:*

Be it known that I, HENRY D. CAHILL, of Boston, county of Suffolk, State of Massachusetts, have invented certain new and useful Improvements in Bicycle-Carriers, of which the following is a specification, reference being had to the accompanying drawings.

The object of my invention is to produce a simple, convenient, economical, and widely-adjustable device designed to be attached to bicycles for carrying bundles or the like.

In the accompanying drawings, Figure I is a top plan view of my carrier, showing a part to which it is attached and adjusted in one position with respect thereto. Fig. II is a similar view showing the carrier adjusted at right angles to the position shown in Fig. I. Fig. III is a side elevation of my carrier with one form of device for securing it in place, and Fig. IV a view of a modified form of securing device. Fig. V is a group showing a section of the carrier, the top of securing device, and nut by which the adjustment of the carrier is effected.

Referring to the figures on the drawings, 1 indicates the cross-bar of my carrier, which is preferably made of light material, as, for example, brass. To the opposite ends are firmly secured by any suitable means arms 2, which are preferably flexible. They may be pierced at their opposite ends with transverse slots 3 to receive straps 4, and are also preferably provided along their outer edges with circular perforations 5, through which the end of a string may be passed for tying a bundle to the carrier.

For fastening the carrier in position any suitable securing mechanism may be employed, but I prefer a split collar, which may consist of a fixed part 6, secured to the cross-bar, and a movable part 7, either hinged thereto at one end, as indicated at 8 in Fig. III, or transversely pivoted thereto by means of a screw-threaded bolt 9 and thumb-nut 10, as shown in Fig. IV, the bolt in this example passing through apertures 11 in terminal flanges 12 upon the two parts of the split collar. The opposite ends of the parts of the split collar are in each instance preferably flanged, as indicated at 13, and fastened together by a screw-stud 14, pivoted within a recess 15 in the flange of the fixed part and entering a recess or bifurcation 17 in the flange of the movable part, a thumb-nut 18 serving to join the parts together.

In practice the carrier may be applied either to the steering-head, the handle-bar, or the reach of the bicycle, and for that purpose provision must be made for wide variations of adjustment of the cross-bar with respect to the securing device. For this purpose I prefer to employ a stud-bolt 19, projecting from a flat table 20 of the split collar and designed to enter an aperture 21 in the cross-bar, to which the collar is secured by a nut 22, screwing on the end of the stud-bolt. To one side of the stud-bolt and parallel with it I provide a pin 23, and in the cross-bar within the path of the sweep of the pin apertures 24, adapted to receive and hold the pin and prevent the rotation of the stud-bolt in the cross-bar. The length of the pin is less than the thickness of the cross-bar, so that the nut 22, when screwed in place, serves to hold the parts firmly together. As many apertures 24 may be provided as adjustments may be required, but in practice two apertures are usually sufficient.

It is obvious that the pin might be placed in the cross-bar and the apertures be made in the table of the split collar, but this is an obvious variation.

What I claim is—

In a bicycle-carrier, the combination with a cross-bar and means for adjustably securing it upon a bicycle, of flexible arms projecting from the ends of the cross-bar provided with terminal slots to receive straps, and marginal apertures therein for the reception of strings, substantially as specified.

In testimony of all which I have hereunto subscribed my name.

HENRY D. CAHILL.

Witnesses:
THOMAS P. BUTLER,
JAMES E. McCAFFERTY.